United States Patent
Noyes

(10) Patent No.: US 6,315,903 B1
(45) Date of Patent: Nov. 13, 2001

(54) METHOD FOR PROCESSING LIQUID WASTE

(75) Inventor: Dan G. Noyes, Houston, TX (US)

(73) Assignee: Downstream Environmental, LLC, Houston, TX (US)

( * ) Notice: Subject to any disclaimer, the term of this patent is extended or adjusted under 35 U.S.C. 154(b) by 0 days.

(21) Appl. No.: 09/535,640

(22) Filed: Mar. 24, 2000

(51) Int. Cl.[7] .......................................... C02F 3/00
(52) U.S. Cl. .................. 210/601; 210/620; 210/173; 210/767; 210/774; 210/799; 210/800; 210/787
(58) Field of Search ................... 210/601, 620, 210/173, 767, 774, 799, 800, 787

(56) References Cited

U.S. PATENT DOCUMENTS

| | | |
|---|---|---|
| Re. 31,185 | 3/1983 | Greenfield . |
| 3,623,976 | 11/1971 | Cessna . |
| 4,013,516 | 3/1977 | Greenfield et al. . |
| 4,040,958 | 8/1977 | Rammler . |
| 4,686,049 | 8/1987 | Klobenzer et al. . |
| 4,975,195 | * 12/1990 | Urbani .................. 210/608 |
| 5,098,584 | 3/1992 | Leen . |
| 5,545,326 | 8/1996 | Petering . |

* cited by examiner

Primary Examiner—Chester T. Barry
(74) Attorney, Agent, or Firm—Keeling Law Firm

(57) ABSTRACT

A raw sewage treatment system for treating grease trap raw sewage waste. The raw sewage is transferred via closed piping into an emulsifier/grinder pump into a first heating chamber where the fats in the waste melt. Here the heavier solids are allowed to settle out, and are removed by a conveyor. The waste then travels to a second heating chamber, where pathogens are killed at a higher temperature than found in the first heating chamber. The waste is de-emulsified in the second heating chamber, and the fats are pumped off the top. The remaining liquid passes through a shaker screen and a two-phase centrifuge to remove additional solids. The liquid then is treated in a biological reactor to reduce the volatile organics. The water is then discharged either to the environment or into a wastewater sewer.

19 Claims, 1 Drawing Sheet

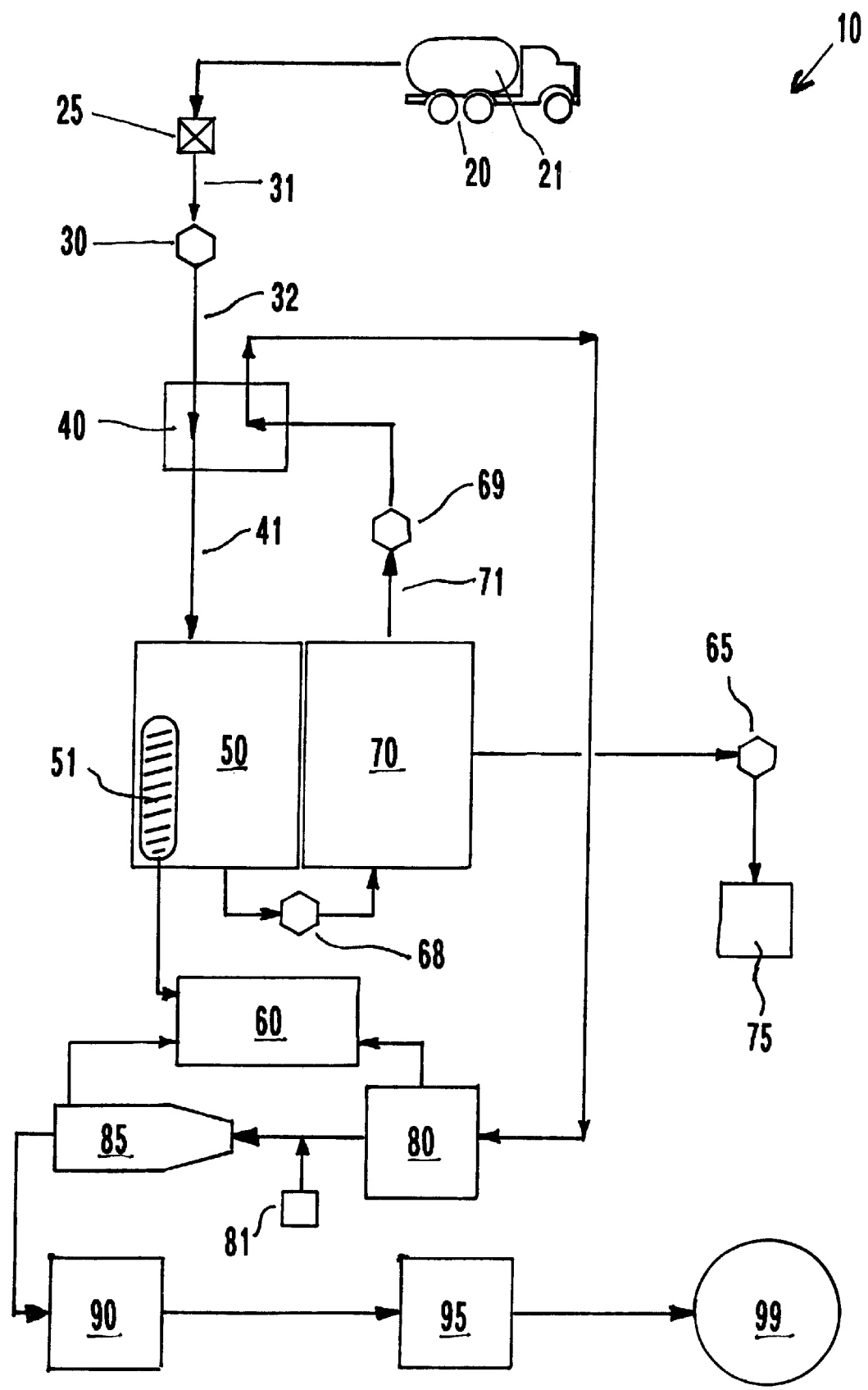

METHOD FOR PROCESSING LIQUID WASTE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention.

This invention relates to a method and system for treating non-hazardous liquid waste, such as grease trap waste or raw grease grit and septage. Specifically, the invention describes a system applicable to concentrated liquid waste, such as grease trap wastewater, for removing from the water volatiles, grease, trash, solids, etc., for pre-treatment into a sewage treatment system or full treatment for direct discharge into the environment. Non-hazardous liquid waste is referred in the industry alternatively and comprises raw sewage, grease trap waste, grit trap waste, and processing waste.

2. Related Art

Food preparation, meat and food processing inherently have the byproduct of fats and grease waste. Food, grease and oils are inherent in water from processes and washdown operations. This waste water forms an emulsion that must first pass through a grease trap, as known in the art of waste water treatment, before the outfall water is allowed to discharge into a sewer collection system. In certain smaller establishments, all sanitary sewage may likewise directed through the grease trap.

The grease trap comprises an infall pipe, which discharges the water/grease/food wastewater drainage into an underground tank capable of holding 300 to 30,000 gallons. Within the tank are barriers that trap and partially separate heavy solids (rock, grit, inorganic material such as eating utensils, personal items, etc.), floating trash (light plastics such as straws), and much of the fats, oils and grease (FOG, comprising vegetable oils, animal fat, tallow) from the food preparation/processing area drains. Periodically the grease trap becomes saturated with solids, trash and FOG's, no longer effectively trapping them, and must be drained (typically every 60–180 days) per local health regulations. A vacuum truck then drops a hose into the tank and sucks out the contents of the tank, including the floating trash, FOG/water emulsion and heavy solids. This raw liquid waste that is sucked up by the vacuum truck must then be disposed. It is this disposal to which this invention is directed, through the inventive treatment method of the raw liquid waste.

Dismissing illegal methods of disposal (dumping on open land or into a storm sewer system), there are several methods in the prior art that treat and dispose the raw waste. The oldest and simplest method is to dump the waste into an open pit, where it is mixed with ash and dirt to hydrate the mixture to form a substantially dry material, which is removed with a backhoe and placed in a landfill. This system creates a severe odor problem and takes large amounts of space in landfill areas.

Another prior art method of raw waste disposal is to dump the waste into an open pit, where it is allowed to separate by gravity. The lighter FOG is skimmed off the top, purified by a method known in the art, and recycled. The remaining concentrated wastewater is sucked out and discharged into a wastewater sewer system. The remaining bottom sludge is stabilized with flyash, removed and buried or taken to a landfill. This method likewise creates a severe odor problem, requires extensive landfill use and does not clean the water to a desired level adequate for pre-treatment requirements.

A third prior art method uses biological augmentation. In this method, microbes and surfactants are mixed with the raw waste. The surfactants break up the fat globules, allowing the microbes to surround and/or ingest the smaller pieces. Bran is often added to the mixture to provide a surface for the microbes to germinate. This process creates additional waste from the bran. Further, it has the limitation of inefficiency due to the microbes dying or becoming dormant before processing the fats, thus releasing the fats back into the wastewater causing potential blockage of the piping in the collection system. The process is expensive due to the cost of microbe replacement and maintenance (such as unclogging lines), and is difficult to regulate.

It would therefore be useful improvement of the prior art for a wastewater treatment system to remove FOG's and other solids from water from a grease trap that does not have the limitations of the prior art, including those described above.

BRIEF SUMMARY OF THE INVENTION

Accordingly, the objectives of this invention are to provide, inter alia, a new and improved method of treating concentrated wastewater sewage that:

- has a low odor;
- is energy efficient;
- regulated inlet flow surges for optimizing treatment processing;
- cleans the water in the raw sewage to a level that is acceptable for discharge into a city sewage system or directly to the environment; and
- is cost efficient.

These objectives are addressed by the structure and use of the inventive process. When the process is used in the treatment of grease trap waste, vacuum trucks containing raw grease trap waste is offloaded into a sealed pipe through a grinder/emulsifier pump. The liquid then passes through heat exchanger, which also functions as an equalization tank to mitigate inlet surges into the system, and for preheating of the raw waste before entering the main heating vessel. In this vessel, the temperature of the waste is raised to approximately 140° F., at which temperature the FOG reaches a sufficiently low viscosity where the heavy solids (such as rocks, spoons, etc.) cease to be suspended and settle out, where they are removed using a conveyor, preferably screw type.

The liquid then enters a second chamber of the heating vessel where the temperature is raised to 180° F. In this second chamber, a series of serpentine baffles de-emulsify the FOG, allowing the FOG to rise to the top of the vessel for later removal. The FOG is then drawn off with a pump, and the water and remaining suspended solids settle to the bottom of the vessel.

The water and remaining solids are pumped out and passed through the heat exchanger, where their heat is transferred to the incoming raw waste. A vibrating screen having a 200–400 mesh catches and dewaters the majority of the remaining solids. The water is then passed through a centrifuge to eliminate all remaining suspended solids in the water.

The water is then pumped into a high rate aerobic biological reactor, where the volatile organics present are reduced to acceptable concentrations for discharge into a local wastewater treatment sewer. The water then enters a holding tank, where it can be used for wash-down purposes. In this final tank, ozone or other disinfectants (such as chlorine) can be recirculated for further volatile reduction, if so desired.

If it is desired to reduce the Biological Oxygen Demands (BOD) to a level acceptable for release of the water directly to the environment (e.g. discharge into a local river), additional cycles through high rate aerobic biological reactors are taken until the BOD is acceptably low.

Other objects of the invention will become apparent from time to time throughout the specification hereinafter disclosed.

BRIEF DESCRIPTION OF THE DRAWINGS

FIG. 1 depicts a flow chart block diagram of the inventive process.

DETAILED DESCRIPTION OF THE INVENTION

The present invention is described as treatment system 10, depicted in block diagram form in FIG. 1.

Grit trap, grease trap and septage, referred to here as raw sewage, is typically brought to the site of treatment system 10 by vacuum truck 20, which typically is the same truck that sucked the raw sewage out of a grease trap. Vacuum truck 20 has a vacuum pump that creates negative pressure in pressure tank 21, which is mounted on vacuum truck 20. This negative pressure allows raw sewage to be sucked out of a grease trap into pressure tank 21 through a hose. To discharge the raw sewage, the pump direction is reversed, creating a positive pressure inside pressure tank 21. Pressure tank 21 is hydraulically connected to receiving valve 25 via a flexible hose. Receiving valve 25 is connected to connection pipe 31, which preferably has in inner diameter of at least 3", preferably 4", to minimize clogging from the FOG and high levels of solids present.

Connection pipe 31 attaches receiving valve 25 and emulsifier/grinder pump 30. Emulsifier/grinder pump 30 reduces all solid material for subsequent processing and to emulsify the mixture for uniform consistency for treatment. Emulsifier/grinder pump 30 is connected to heat exchanger 40 by second connection pipe 32, which preferably has in inner diameter of at least 3", preferably 4". Heat exchanger 40 is connected via a fluid conduit to heating vessel first chamber 50. Heating vessel first chamber 50 acts as a heater and a gravity separator. The heating function melts the FOG to a temperature where they have a sufficiently low viscosity, similar to water, allowing the heavy solids to readily settle out. Heat is supplied preferably by internal electric heating coils to minimize odors.

The gravity separation function of heating vessel first chamber 50 allows primary solids, such as pieces of metal and other heavier-than-water trash that have been ground up by emulsifier/grinder pump 30 to sink to the bottom of a tank. Heating vessel first chamber 50 also functions as a surge equalization tank. Vacuum trucks 20 typically offload raw sewage at 300–500 gpm intermittently. Heating vessel first chamber 50 receives the inlet surge from vacuum trucks 20, and then allows for subsequent lower continuous liquid flow rates to the subsequent components of treatment system 10. Heating vessel first chamber 50 preferably then has adequate volumetric capacity to absorb this surge.

Heating vessel first chamber 50 comprises a solid removing component, which may be a rake system, chain and flight or hopper bottom dump, all known in the prior art. In the preferred embodiment, the solid removing component is screw conveyor 51. Screw conveyor 51 initiates at the bottom of heating vessel first chamber 50. Primary solids are engaged by screw conveyor 51 along with ambient fluid surrounding the primary solids. As the primary solids travel up screw conveyor 51, these ambient fluids flow back down to the bottom of heating vessel first chamber 50, while the primary solids continue up the screw conveyor. Solids container 60 is positioned below the terminating end of screw conveyor 51, which dumps the primary solids into solids container 60, typically a roll-off box.

The remaining emulsion is then pumped into heating vessel second chamber 70. In large applications and designs, heating vessel second chamber 70 is in a different tank structure from heating vessel first chamber 50. In either a large or small design, heating vessel first chamber 50 and heating vessel second chamber 70 are separated chambers. If located in the same vessel, heating vessel first chamber 50 and heating vessel second chamber 70 are separated by a non-insulating dividing wall.

Heating vessel second chamber 70 is a specialized oil/water separator. A series of plates, such as parallel plate separators or preferably serpentine baffles as known in the art, enhance de-emulsification of the FOD and liquid. As the FOG de-emulsifies, it separates along with other floatable material such as plastic, and rises to the top of the vessel where is accumulates. When sufficient quantity of FOG and floatable material collects, it is drawn off with oil pump 65 and transferred to oil filtration system 75. Oil filtration system 75 is any of the numerous types of oil filtration system/methods known in the art of oil recovery. If the FOG is to be recycled, the emulsion in heating vessel second chamber 70 is supplied with addition heat until it reaches a temperature of 180° F. to 210° F., preferably 180° F., for a period of no less than 20 minutes.

The remaining water, containing fine suspended solids, is then pumped, preferably with a positive displacement pump at a constant flow, back through heat exchanger 40, where it transfers some of its heat to the incoming raw waste being pumped into heating vessel first chamber 50 via emulsified waste piping 41. This heat exchange is through standard heat transfer methods, wherein the raw waste is pumped through emulsified waste piping 41, which is receives heat from the water from heating vessel second chamber 70 flowing through heated water piping 71. Heat transfer from heated water piping 71 to emulsified waste piping 41 is by standard methods known in the field, either by conduction (pipes being in direct contact) or convection (with a vector fluid, either air or liquid, transferring heat between the piping). This design allows heat to be transferred from the heated partially processed water coming from heating vessel second chamber 70 to the raw waste coming from the emulsifier/grinder pump 30 prior to being first heated in heating vessel first chamber 50. The system is therefore energy conserving.

After passing through heat exchanger 40, the water from heating vessel second chamber 70 passes across a screen, preferably vibrating screen 80 oscillating in the vertical direction at an acceleration of 6 G's, to facilitate the separation of the solids from the remaining water. In the preferred embodiment, there are three individual screen sections, each at a 3° angle off horizontal from back to front, arranged so that the vibratory forces cause the solids to "climb" up each individual screen section and "fall" onto the next section, repeating the process from screen section to screen section. Each screen section has screen mesh with 200–400 mesh openings (0.0027" to 0.0015" space openings) to catch and dewater all but the smallest of the remaining suspended solids. In addition, the vibrating screen mechanism also employs the use of a movable spray nozzle header, which directs wash water onto the screen sections to prevent plugging, or clogging of the screen sections. The wash water is sprayed in an oscillatory fashion perpendicular to the movement of the solids across the screen, to ensure complete coverage of the screen sections. The usage frequency of the spray nozzles shall be infinitely adjustable from once per day to continuous operation, depending on the needs of the operator.

The water is then sent through centrifuge 85 that separates remaining fine particles from the water. In the preferred embodiment, lime is added to the water previous to the introduction into centrifuge 85 until the pH of the water reaches 7.5 to 9.0, preferably 8.0. This pH creates a biologically conducive environment for the aerobic microbes to proliferate. In addition, the lime serves to coalesce fine suspended organic particles to enhance their ability to settle. In the preferred embodiment, centrifuge 85 is a two phase centrifuge spinning at 2600 to 3500 rpm, preferably 3500 rpm, and comprising an internal scroll, typically operating at 3400 rpm, for screw conveying solids out of conveyor 85 into solids container 60 for future disposal.

The water from centrifuge 85 is then pumped to bio-reactor 90. In the preferred embodiment, bio-reactor 90 is a high rate aerobic biological reactor, in which the volatile organics present in the water are reduced to acceptable discharge concentrations, thus reducing the biological oxygen demand (BOD) of the water. In the preferred embodiment, bio-reactor 90 is that described in U. S. patent application Ser. No. 09/328,255, Wastewater Treatment System, filed on Jun. 08, 1999 by Noyes, et al., and here incorporated by reference as essential material for disclosing the best mode of operation. The water is then pumped to holding tank 95, where the water can be used for wash-down purposes, including that described for cleaning vibrating screen 80.

In the alternative, water from bio-reactor 90 is passed through subsequent bio-reactors 90 until the BOD is reduced to the point that the water can be directly discharged into the environment (a stream, on land, etc.). If the water has a BOD that is too high for direct discharge, then it still has been treated sufficiently (by removing FOG, volatiles and other solids) to be discharged into a local waste water treatment sewer for piping to a local waste water treatment facility.

OPERATION

In the preferred embodiment shown in FIG. 1, raw sewage is pumped from vacuum truck 20, typically at a rate of 300–500 gpm. Vacuum truck 20 typically holds 2,000 to 4,600 gallons of raw waste, which includes water, FOG, grit, dirt, plastic, metal and other trash. The raw waste is pumped into a closed piping system through receiving valve 25. Raw waste is pushed out of the tank of vacuum truck 20 by positive pressurization of the tank using vacuum truck 20's pump. The tank is connected to receiving valve 25, which remains closed until connected to vacuum truck 20. The raw waste is further assisted in being unloaded from vacuum truck 20 by emulsifier/grinder pump 30, which preferably operates at 300–500 gpm. The tank of vacuum truck 20 is therefore quickly unloaded. Emulsifier/grinder pump 30 also grinds and pulverizes solid material and stringy material (such as hair, fibers) present in the raw waste to a general particle size of preferably less than 1/8", producing a homogenous mixture of raw waste without stratification. Alternatively, a separate grinder and pump can be used to achieve the same effect of combined emulsifier/grinder pump 30.

Once the raw waste is ground, pulverized and emulsified by emulsifier/grinder pump, it is transferred through heat exchanger 40 to heating vessel first chamber 50 through connection pipe 31. Connection pipe 31 is preferably at least 3" in diameter, to minimize clogging from FOG buildup on the interior wall of connection pipe 31 and congealing inside connection pipe 31.

Heating vessel first chamber 50 receives the surge from raw waste being offloaded from vacuum truck 20. Subsequent movement of the liquid being treated through the rest of raw sewage treatment system 10 is now at a constant flow rate controlled by matched rate pumps first water pump 68 and second water pump 69, preferably each operating at approximately 65 gpm, with second water pump 69 slightly lower to compensate for FOG's and solids that have been removed.

Prior to entering heating vessel first chamber 50 via second connection pipe 32, the raw waste passes through heat exchanger 40 for pre-heating of the raw waste. The heat for this pre-heating is provided by heated water piping 71, which contains heated water from heating vessel second chamber 70.

Heating vessel first chamber 50 heats the raw waste to a temperature between 100° F. and 200° F., preferably 140° F., making the FOG's, comprising Fats, Oils, & Grease which is comprised mainly of vegetable oils and animal fats and tallow, have the same approximate viscosity as water. The heavy solids (such as rocks, spoons, etc. that have been ground by emulsifier/grinder pump 30) cease to be suspended because of the lowered viscosity of the FOG's, and thus readily settle out for removal, preferably by a screw conveyor 51. These heavy solids are dumped into solids container 60, and the remaining liquid is pumped by first water pump 68 into heating vessel second chamber 70. As noted above, heating vessel second chamber 70 may be in a separate vessel, or may be a second chamber of the same vessel in which heating vessel first chamber 50 is contained.

If the FOG's are to be recycled, the liquid in heating vessel second chamber 70 is heated to a temperature in the range of 180° F. to 210° F., preferably 180° F., to facilitate pathogen kill in the liquid. If the FOG's are not to be recycled, then the temperature is left in the same ranges specified in heating vessel first chamber 50. Note here that all heating is preferably by electric heating coils, to allow a closed system with minimal airborne discharge.

In heating vessel second chamber 70, the waste liquid is de-emulsified. In the preferred embodiment, the FOG/water emulsion travels through a parallel plate gravity separator in a serpentine fashion. The serpentine flow pattern through the plates enhances solid separation and de-emulsification of the FOG. Alternatively, a non-serpentine or standard gravity separator can be used at lower efficiencies. FOG floats to the top of the liquid in heating vessel second chamber 70.

The FOG's are then pumped off the top of heating vessel second chamber 70 by oil pump 65, and are sent to oil filtration system 75, which is any type of oil filtration system known in the art.

The remaining liquid continues to travel through heating vessel second chamber 70, and is pumped out by second water pump 69. Second water pump 69 is preferably synchronized to pump the liquid at a rate roughly approximate the gpm output of first water pump 68 less the FOG's and solids that have been subsequently removed between the two pumps.

To conserve energy, the waste water is pumped from second water pump 69 through heated water piping 71 back through heat exchanger 40. Heat from the heated waste water from heating vessel second chamber 70 is transferred to the incoming raw waste in emulsified waste piping 41.

The water in heated water piping 71 continues to a filtering screen, preferably vibrating screen 80, to remove additional remaining solids. In the preferred embodiment, vibrating screen 80 has three separate screen sections, each at a 3° upward angle, arranged so that the vibratory forces cause the solids to "climb" up the topmost screen and "fall" onto the next lower section, repeating the process until the solids drop into solids container 60. To prevent the mesh screens of vibrating screen 80 from clogging, they are sprayed with oscillating spray nozzles with water, preferably from holding tank 95, at a frequency determined by the operator. This spray is preferably perpendicular to the movement of the solids across the screen, to ensure complete coverage if each screen section.

In the preferred embodiment, the remaining waste water is mixed with lime from lime feed 81 until the water reaches a pH of 7.5 to 9.0, preferably 8.0.

The remaining waste water is then piped to centrifuge 85, preferably a two-phase centrifuge spinning in the range of 2600 to 3500 rpm, preferably at 3500 rpm. Internal to the centrifuge is a screw scroll operating at a high but slightly lower rpm, which removes the centrifuged solids out of centrifuge 85 and drops them into solids container 60.

Solids from screw conveyor 51, vibrating screen 80 and centrifuge 85 that have been deposited in solids container 60 are then removed to a landfill facility for disposal.

The remaining liquid coming out of centrifuge 85 is then pumped into a high rate aerobic biological reactor where the volatile organics are reduced to acceptable discharge concentrations. If the level of volatile organics need to be reduced to a level acceptable for direct discharge into the environment, multiple bio-reactors 90 operating in which the waste water is pumped in series from one to the next are typically required. If the level of volatile organics need only be reduced to a level where the waste water is acceptable in a local waste water treatment plant, than a single bio-reactor 90 is typical. Note that in the best most, bio-reactor 90 is an aerobic system, that being much more efficient and effective than standard anaerobic bio-reactors.

Water from bio-reactor 90 then flows into water holding tank 95, from which it can be pumped for wash down purposes as described above. Water not used for wash down purposes is discharged to a local waste water sewer line or the environment, depending on the level of volatile organics present in the water.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A method for treating raw liquid waste, comprising:
   grinding said waste;
   emulsifying said waste into an emulsion;
   heating said emulsion in a first chamber heating vessel;
   removing primary solids from said emulsion;
   heating said emulsion in a second chamber heating vessel;
   de-emulsifying said emulsion to form a first layer of fats, oils and grease and a second layer of water;
   removing said first layer of fats, oils and grease;
   passing said second layer of water through a filtering screen to separate secondary solids from said water;
   removing said secondary solids from said filtering screen;
   separating by enhanced separation tertiary solids from said water;
   removing said tertiary solids; and
   processing said water in a biological reactor.

2. A method for treating raw liquid waste, comprising:
   grinding said waste;
   emulsifying said waste into an emulsion;
   heating said emulsion in a first chamber heating vessel;
   removing primary solids from said emulsion;
   heating said emulsion in a second chamber heating vessel;
   de-emulsifying said emulsion to form a first layer of fats, oils and grease and a second layer of water;
   removing said first layer of fats, oils and grease;
   passing said second layer of water through a filter to separate secondary solids from said water;
   removing said secondary solids from said filtering screen;
   separating by enhanced separation tertiary solids from said water;
   removing said tertiary solids; and
   processing said water in a biological reactor.

3. The method as in claim 2, further comprising receiving said waste from a vacuum truck.

4. The method as in claim 2, wherein said emulsion step is performed by a grinder pump.

5. The method as in claim 4, further comprising providing fluid communication between said grinder pump and said first chamber heating vessel with a pipe having an internal diameter of at least 3".

6. The method as in claim 2, further comprising preheating said emulsion before said heating step in said first chamber heating vessel.

7. The method as in claim 6, wherein said preheating step is accomplished in a heat exchanger, wherein heat is provided to said heat exchanger by piping containing said water leaving said second chamber heating vessel.

8. The method as in claim 2, wherein said first chamber heating vessel is heated to a temperature within the range of 100° F.–200° F.

9. The method as in claim 2, wherein said second chamber heating vessel is heated to a temperature within the range of 180° F.–210° F.

10. The method as in claim 2, further comprising a first vessel comprising said first chamber heating vessel; and a separate second vessel comprising said second chamber.

11. The method as in claim 2, wherein said filter for separating said secondary solids from said water is a shaker screen filter, said shaker screen comprising a mesh having space openings in the range of 200 to 400 mesh (0.0027" to 0.0015").

12. The method as in claim 2, said step for removing said primary solids from said emulsion comprising using a gravity separator and a means for removing said primary solids.

13. The method as in claim 12, said means for removing said primary solids comprising a screw conveyor.

14. The method as in claim 12, further comprising raising a pH of said water to a range between 7.5 to 9.0 before said separation of said tertiary solids from said water by said enhanced separation.

15. The method as in claim 2, wherein said biological reactor is a high rate aerobic bio-reactor.

16. The method as in claim 2, further comprising:
processing said water from said biological reactor through at least one additional biological reactor; and
discharging said water directly into the environment.

17. The method as in claim 2, wherein said raw liquid waste is a grease trap waste.

18. The method as in claim 2, said step separating said tertiary solids from said water comprising a two-phase centrifuge.

19. The method as in claim 3, further comprising:
holding said water from said biological reactor in a holding tank; and
discharging said water from said holding tank.

* * * * *